US010552949B2

United States Patent
Loginov et al.

(10) Patent No.: US 10,552,949 B2
(45) Date of Patent: Feb. 4, 2020

(54) CONTRAST ENHANCEMENT AND REDUCTION OF NOISE IN IMAGES FROM CAMERAS

(71) Applicant: ABBYY Development LLC, Moscow (RU)

(72) Inventors: Vasily Vasilyevich Loginov, Moscow (RU); Ivan Germanovich Zagaynov, Dolgoprudniy (RU)

(73) Assignee: ABBYY PRODUCTION LLC, Moscow (RU)

( * ) Notice: Subject to any disclaimer, the term of this patent is extended or adjusted under 35 U.S.C. 154(b) by 145 days.

(21) Appl. No.: 15/851,344

(22) Filed: Dec. 21, 2017

(65) Prior Publication Data
US 2019/0188835 A1    Jun. 20, 2019

(30) Foreign Application Priority Data
Dec. 14, 2017   (RU) ................................ 2017143913

(51) Int. Cl.
*G06T 5/00*      (2006.01)
*G06K 9/18*      (2006.01)
(Continued)

(52) U.S. Cl.
CPC .......... *G06T 5/008* (2013.01); *G06K 9/00463* (2013.01); *G06K 9/18* (2013.01); *G06K 9/325* (2013.01); *G06T 5/002* (2013.01)

(58) Field of Classification Search
CPC .......... G06T 5/002; G06T 5/008; G06K 9/18; G06K 9/325; G06K 2209/01; G06K 2209/15; H04N 1/4092
(Continued)

(56) References Cited

U.S. PATENT DOCUMENTS 5,212,741 A *   5/1993   Barski ...................... G06K 9/38
                                                     346/2
7,046,307 B1    5/2006   Hui
(Continued)

OTHER PUBLICATIONS

H. Yu and A. Li, Real-Time Non-Local Means Image Denoising, Algorithm Based on Local Binary Descriptor, KSII Transactions on Internet and Information Systems, Feb. 29, 2016, 12 pages, vol. 10 No. 2.
(Continued)

*Primary Examiner* — Ali Bayat
(74) *Attorney, Agent, or Firm* — Lowenstein Sandler LLP

(57) ABSTRACT

The subject matter of this specification can be implemented in, among other things, a method including identifying one or more blocks in an electronic image that depicts text characters. The method includes identifying one or more text blocks among the blocks that depict the text characters. The method includes identifying an average text contrast for each of the text blocks. The method includes identifying a type for each pixel in each of the text blocks based on the average text contrast. The method includes performing local adaptive filtering on a first neighborhood of pixels around each pixel in each of the text blocks to determine a brightness for the pixel based on the identified type. The method includes storing, in at least one memory, the electronic image including the determined brightness for each pixel in each of the text blocks.

20 Claims, 4 Drawing Sheets

(51) Int. Cl.
*G06K 9/00* (2006.01)
*G06K 9/32* (2006.01)

(58) Field of Classification Search
USPC .......................................................... 382/274
See application file for complete search history.

(56) References Cited

U.S. PATENT DOCUMENTS

| | | | |
|---|---|---|---|
| 8,018,504 B2 | 9/2011 | Kelly | |
| 8,086,007 B2 | 12/2011 | Yan et al. | |
| 8,154,629 B2 | 4/2012 | Kanemitsu et al. | |
| 9,031,322 B2 | 5/2015 | Lai | |
| 9,646,202 B2* | 5/2017 | Abdollahian | G06T 3/60 |
| 9,973,654 B1* | 5/2018 | Subbaian | H04N 1/4092 |
| 2003/0026480 A1* | 2/2003 | Karidi | G06K 9/00456 |
| | | | 382/176 |
| 2016/0210523 A1* | 7/2016 | Abdollahian | G06K 9/00442 |
| 2018/0012101 A1* | 1/2018 | Mizes | G06K 9/346 |

OTHER PUBLICATIONS

Jong-Sen Lee, Digital Image Smoothing and the Sigma Filter, Computer Vision, Graphics, and Image Processing, 1983, 15 pages, vol. 24.

O.U. Nirmal Jith and R. Venkatesh Babu, Joint Bilateral Filtering based Non-local Means Image Denoising, Signal Processing and Comunications (SPCOM), 2014, 5 pages.

Roman Garnett, Timothy Huegerich, Charles Chui, and Wenjie He, A Universal Noise Removal Algorithm with an Impulse Detector, 2008, 7 pages, National Science Foundation.

Suk Hwan Lim, Characterization of Noise in Digital Photographs for Image Processing, IS&T/SPIE Electronic Imaging, Oct. 21, 2008, 11 pages, vol. 6069, Hewlett-Packard Laboratories.

Sweety Deswal, Shailender Gupta, and Bharat Bhushan, A Survey of Various Bilateral Filtering Techniques, International Journal of Signal Processing, Image Processing and Pattern Recognition, 2015, 16 pages, vol. 8 No. 3.

Vinh-Hong, Henryk Palus, and Dietrich Paulus, Edge Preserving Filters on Color Images, International Conference on Computational Science, 2004, 7 pages.

* cited by examiner

CONTRAST ENHANCEMENT AND REDUCTION OF NOISE IN IMAGES FROM CAMERAS

REFERENCE TO RELATED APPLICATIONS

The present application claims the benefit of priority under 35 U.S.C. § 0119 to Russian Patent Application No. 2017143913 filed Dec. 14, 2017, the disclosure of which is incorporated herein by reference in its entirety for all purposes.

TECHNICAL FIELD

This instant specification relates to enhancing contrast and reducing noise in images of documents from cameras in a device, such as a mobile device.

BACKGROUND

Printed natural-language documents continue to represent a widely used communications medium among individuals, within organizations, and for distribution of information among information consumers. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents.

Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years. Computational optical-character-recognition methods and systems and electronic scanners together provide reliable and cost-effective imaging of printed documents and computational processing of the resulting digital images of text-containing documents to generate electronic documents corresponding to the printed documents.

With the advent of camera-containing smart phones and other mobile, processor-controlled imaging devices, digital images of text-containing documents can be generated by a large variety of different types of ubiquitous, hand-held devices, including smart phones, inexpensive digital cameras, inexpensive video surveillance cameras, and imaging devices included in mobile computational appliances, including tablets and laptops. Digital images of text-containing documents produced by these hand-held devices and appliances can then be processed, by computational optical-character-recognition systems, including optical-character-recognition applications (also referred to Optical Character Recognition (OCR) processing) in smart phones or those implemented on a server, to produce corresponding electronic documents.

In the locally-implemented OCR processing function, the hand-held device can implement the OCR function and process the digital image to produce a recognized text document. Alternatively, the digital image captured by the user electronic device (either in a compressed form or as is) is transmitted, via a communication network, to a server of the optical-character-recognition systems for performing the server-based OCR function. The server then (i) receives the digital image, (ii) de-compresses the compressed digital image to obtain a decompressed digital image (in those scenarios where the image is transmitted in a compressed form between the hand held device and the server), and (iii) executes the server-based OCR function to generate a recognized text document based on the digital image, the recognized text document based containing text generated on the basis of the digital image. The server can then transmit back the recognized text document to the user electronic device via the communication network (in an original or a compressed state thereof).

DETAILED DESCRIPTION

Figure 1:
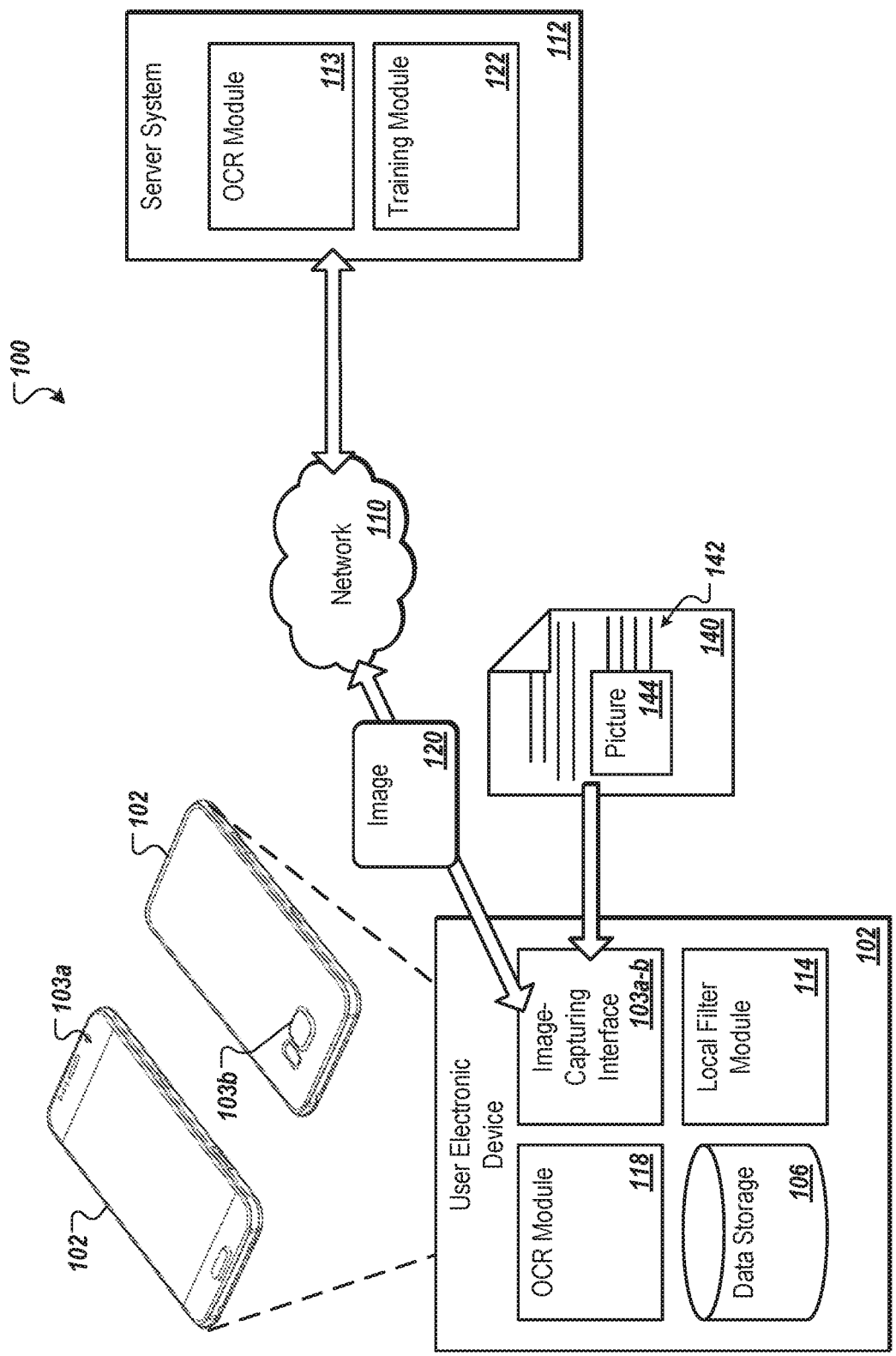
FIG. 1 is a schematic diagram that shows an example of a system for enhancing contrast and/or reducing noise in an image of a document from a camera in a device, such as a mobile device.

This document describes systems and techniques for enhancing contrast and/or reducing noise in an image of a document from a camera in a device, such as a mobile device. To reduce errors in optical character recognition (OCR), the systems and techniques described herein obtain a high-quality image of the document with minimum noise. The systems and techniques suppress noise and local de-contrasting of problem pixels in the image.

Noisy images obtained in low light conditions often contain local areas that are out-of-focus or blurry. Conventional techniques for sharpening images, such as "unsharp masking," are sometimes applied to images before calling OCR systems. However, the effect of the use of these conventional techniques on OCR is limited by the accompanying noise increase and the manifestation of problems in the suppression of amplified noise. Typically, an OCR function executed locally on, for example, a mobile device tends to result in a lower quality of the output of the OCR compared to a server-based OCR function (as the locally-executed OCR systems tend to be less complex than the server-executed OCR systems due to the typically limited computational resources available on the hand-held/mobile device as compared to the server dedicated to the server-based OCR function). In either case, whether the OCR function is executed locally or on the server, the OCR function involves some degree of pre-processing of the digital image in order to reduce the number of artifacts in the digital image (e.g., reducing noise, reducing optical blur, etc.). As part of the OCR function, either the hand-held device or the server executes a binarization and computationally-intensive OCR routines.

As part of the binarization and OCR processes, the image of the document is divided into blocks with approximately constant noise and signal characteristics inside the blocks.

Using these characteristics, strongly contrasting pixels are found in the text blocks and the local contrast in each block is reduced to a particular level. In addition, restrictions on the level of de-contrasting (e.g., reduction of the contrast level) of local noise impulses may prevent distortion of text structures. Some of the text structures may be similar to local noise impulses, so the level of de-contrasting is restricted to prevent these text structures from being treated as local noise impulses. Furthermore, the systems and techniques may first reduce the detected impulses and then perform selective smoothing with a new noise variance without switching between impulse filters and smoothing in each pixel. This may allow the averaging filters to work more efficiently. Additionally, smoothing may be performed in a different way for background pixels than is performed for pixels of connected components (e.g., different filtering parameters are used for different kinds of pixels). The systems and techniques may also increase contrast of low-contrast pixels of connected components to a particular level.

The systems and techniques described here may provide one or more of the following advantages. For example, where noise in an image obtained from a camera cannot be described by known noise models (e.g., Gaussian noise or white noise) and the noise cannot be considered independent of a signal or true content of the image, a system may provide for removal of the noise and/or an increase in contrast in the image by taking into account the characteristics of the useful signal for the image. In another example, the systems and techniques described may be able to enhance contrast (e.g., reduce the contrast between noise impulses and background pixels and/or increase the contrast between pixels of connected components and background pixels) and/or remove noise where conventional use of local and non-local selective averaging filters that preserve contours may leave a large number of contrasting noisy pixels. Conventional suppression of impulses in the image with intensified filtration may lead to degradation of the useful signal. A variance of noise in the image equal to 25-30% or higher from the contrast of the text in the image may result in OCR inaccuracy. Accordingly, the systems and techniques described increase the accuracy of OCR technology by enhancing contrast and/or removing noise in images on which OCR is performed, which would otherwise cause spurious results in the OCR.

The details of one or more implementations are set forth in the accompanying drawings and the description below. Other features and advantages will be apparent from the description and drawings, and from the claims.

FIG. 1 is a schematic diagram that shows an example of a system 100 for enhancing contrast and/or reducing noise in an image of a document from a camera in a device, such as a mobile device. The system 100 includes a user electronic device 102. The user electronic device 102 may be, for example, a personal computer (e.g., a desktop computer, a laptop computer, or a netbook computer) or a wireless communication device (e.g., a smartphone, a cell phone, or a tablet). As shown in FIG. 1, the user electronic device 102 is implemented as a wireless communication device.

The user electronic device 102 includes or is in communication with at least one image-capturing interface 103a-b. The image-capturing interface 103a-b includes hardware (and associated software, if needed) for capturing an electronic image 120. The electronic image 120 may be of a physical document 140 containing a text 142 (and potentially non-text items, such as a picture 144). The physical document 140 or other depiction of text in the electronic image 120 may contain one or more pages, some or all of the pages may have different text (which may include overlapping text), different pictures, different layouts, different fonts, or font sizes, etc.

As shown in FIG. 1, the image-capturing interface 103a-b is implemented as a camera. However, the image-capturing interface 103a-b may be implemented as multiple cameras with one or more located on a front face as shown on the user electronic device 102 and the first image-capturing interface 103a and/or one or more located on a back face as shown on the user electronic device 102 and the second image-capturing interface 103b. The following description may refer to the "camera" or the image-capturing interface 103a-b as either one (or both) of the image-capturing interfaces 103a-b. Alternatively or in addition, the image-capturing interface 103a-b may be implemented as a scanner or other image-capturing device for acquiring an electronic image of a physical document.

The user electronic device 102 may include a communication interface for communicating over a network 110 with a server system 112. The network 110 may include one or more of the networking devices that make up the Internet. The server system 112 may include a communication interface for communicating with the user electronic device 102 over the network 110.

In some implementations, either one or both of the user electronic device 102 and the server system 112 can implement a respective OCR processing function. However, in the case where the OCR processing function is executed on the user electronic device 102, the server system 112 may be omitted. The user electronic device 102 may locally execute an OCR module 118 to perform OCR on the electronic image 120 of the physical document 140. The OCR module 118 may be implemented, for example, as a mobile OCR software development kit (SDK). Alternatively or in addition, the server system 112 may receive the image captured by the image-capturing interface 103a-b from the user electronic device 102 over the network 110. The server system 112 may then execute an OCR module 113 to perform OCR on the image of the document. The OCR module 118 at the user electronic device 102 and the OCR module 113 at the server system 112 will be jointly referred to as the OCR module 113, 118 indicating that either module may perform the identified operations.

The user electronic device 102 and/or the server system 112 may be configured to execute instructions for a local filter module 114. The local filter module 114 can be executed in software, hardware, firmware or a combination thereof. The local filter module 114 is configured to enhance contrast and/or reduce noise in the electronic image 120 of the physical document 140 from the image-capturing interface 103a-b in the user electronic device 102 to improve the accuracy of OCR performed by the OCR module 113, 118.

Figure 2:
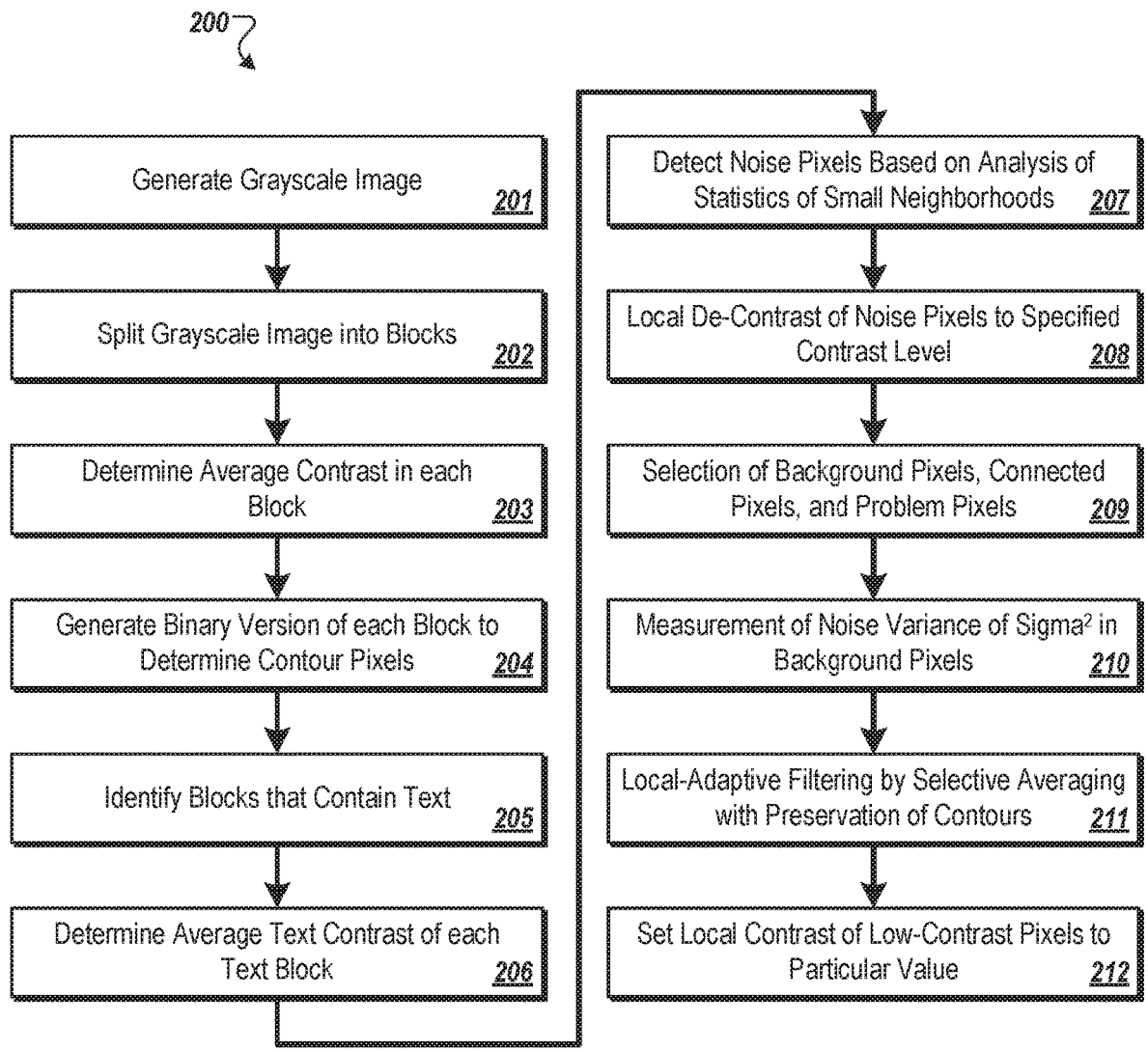
FIG. 2 is flow chart that shows an example of a process for enhancing contrast and/or reducing noise in an image of a document from a camera in a device, such as a mobile device.

FIG. 2 is a flow chart that shows an example of a process 200 for enhancing contrast and/or reducing noise in an image of a document from a camera in a device, such as a mobile device. The process 200 may be performed, for example, by a system such as the system 100. For clarity of presentation, the description that follows uses the system 100 as examples for describing the process 200. However, another system, or combination of systems, may be used to perform the process 200.

At block 201, an image (e.g., of a physical document) depicting text characters is processed to generate a grayscale image. For example, the local filter module 114 may process the electronic image 120 to generate a grayscale image of the electronic image 120. The local filter module 114 may receive the electronic image 120 to be processed by the OCR module 113, 118. In some implementations, the image-capturing interface 103a-b may generate the electronic image 120. Alternatively or in addition, the user electronic device 102 and/or the server system 112 may have previously stored the electronic image 120 and may thereafter retrieve the electronic image 120 from a data storage device 106. Alternatively or in addition, the user electronic device 102 and/or the server system 112 may receive the electronic image 120 over the network 110. In some implementations, the local filter module 114 may receive the grayscale image from an image analyzer or the OCR module 113, 118 before the OCR is performed. The electronic image 120 may be an image of the physical document 140 or other digital image containing text. One example of generating the grayscale digital image is disclosed in the co-owned U.S. patent application Ser. No. 15/165,512 entitled "METHOD AND SYSTEM THAT DETERMINE[S] THE SUITABILITY OF A DOCUMENT IMAGE FOR OPTICAL CHARACTER RECOGNITION AND OTHER IMAGE PROCESSING," filed on May 26, 2016. In some implementations, generation of the grayscale image may be an optional step and, as such, may be omitted. In some implementations, the local filter module 114 may use the electronic image 120 instead of the grayscale image.

At block 202, the grayscale image and/or the image is split into blocks. The blocks may be overlapping and/or non-overlapping. For example, the local filter module 114 may split the grayscale image and/or the electronic image 120 into overlapping and/or non-overlapping blocks. The local filter module 114 may select the size of the blocks such that noise and signal characteristics are approximately constant within the block (e.g., the background brightness, noise, text contrast, and/or blur do not significantly vary within a given block).

In some implementations, the local filter module 114 uses a block size that is large enough so that computing resources are not overloaded. For example, the local filter module 114 may use a block size N that is about 10% of a largest size of the electronic image 120. In some implementations, the local filter module 114 may pre-estimate a font size and select N so that the height of the block contains approximately three to six rows of text from the physical document 140.

In some implementations, the local filter module 114 may use non-overlapping blocks where computing resources are limited. Alternatively, the local filter module 114 may use overlapping blocks when the processed image is returned to the user (e.g., after noise suppression and de-contrasting) as non-overlapping blocks may result in noticeable differences in brightness, contrast, and other parameters at the boundaries between the blocks. In some implementations, the local filter module 114 may prevent the differences at the boundaries of the blocks by choosing blocks that at least partially overlap (e.g., by ten to fifteen percent) with surrounding blocks.

At block 203, an average contrast of each block is determined. For example, the local filter module 114 may determine an average contrast value C (where i represents an identifier of an associated block) associated with the grayscale image and/or the electronic image 120.

In some implementations, the local filter module 114 executes a histogram-based analysis for determining the contrast value CL for the given block defined in block 202. More specifically, in some implementations, the local filter module 114 generates a brightness histogram. Using the brightness histogram, the local filter module 114 determines a minimum and a maximum value of the brightness value such that 0.1% of the pixels of a given block have brightness lesser than the minimum value and 0.1% of the pixels of the given block have brightness higher than the maximum. In some implementations, the brightness value for each pixel in the grayscale image may be an integer number in the range of 0 to 255. The local filter module 114 may then determine the average contrast value C as a difference between the maximum value and the minimum value.

At block 204, a binarized version of each block is generated. For example, the local filter module 114 may generates a binarized version of each block i of the grayscale image and/or the electronic image 120. The local filter module 114 may execute the binarization using an intensity-value-based thresholding algorithm. More specifically, a binarization threshold th of a half-sum of the maximum brightness value $I_{max}$ and the minimum brightness value $I_{min}$ of a given block can be used for the binarization process:

$$th = \tfrac{1}{2}(I_{min} + I_{max})$$

Alternatively, the local filter module 114 may use Otsu's method to calculate the binarization threshold th.

The local filter module 114 then determines the number K of binarized contour pixels of the binarized image within the given block i. As an example, a black pixel can be determined to be a contour pixel if it has a neighboring white pixel (in either a vertical or horizontal direction) and the number of the most probable contour pixels in a surrounding area of, as an example, 3×3 is less than, as an example, seven.

At block 205, blocks that contain text are identified. The remainder of the process 200 may be performed with the subset of the blocks that contain text components. For example, the local filter module 114 may identify the blocks that contain text. In some implementations, the local filter module 114 identifies text blocks based on at least one of: (i) contour binary pixels exceeding a pre-determined proportion of the pixels in the given block (such as three to five percent), (ii) a ratio of black pixels (or white pixels in case the electronic image 120 is inverted text) in the binarized image generated in block 204 being lower than a predetermined threshold P (the pre-determined threshold P can be, as an example, twenty to thirty percent), and (iii) a contrast $C_i$ value being not below a pre-determined level. However, the local filter module 114 may use other methods for selecting text blocks.

At block 206, an average text contrast $C_t$ of each block that contains text is determined. For example, the local filter module 114 may use the brightness histogram of the grayscale image and/or the electronic image 120 and the threshold th calculated at block 204. More specifically, the local filter module 114 may calculate an average value $M_1$ for pixels which have a brightness lower than th. The local filter module 114 may then calculate an average value $M_2$ for pixels that have a brightness that is equal or above th. The local filter module 114 then calculates the average text contrast $C_t$ of the text blocks as:

$$C_t = M_2 - M_1$$

At block 207, noise pixels are detected in each block that contains text based on an analysis of statistics of a small neighborhood n×n of pixels around each pixel in the block. In some implementations, at this stage of the process 200 a type of each of the pixels in each of the text blocks has not yet been determined (e.g., a background pixel type, a connected component pixel type, or a problem pixel type of a connected component). For example, the local filter module 114 may identify the noise pixels based on an absolute value of a difference between a brightness I in a central pixel of the neighborhood of n×n pixels, such as 3×3 or 5×5, and some brightness statistic S of neighboring pixels (e.g., abs(I–S)). The brightness statistic S may represent a central tendency or type of average for the brightness of the n×n pixels. The local filter module 114 may detect a noise pulse where:

$$abs(I-S) > \tfrac{1}{2}C_t$$

The local filter module 114 may use one or more of the following statistics, for example:

S=(max(I(n, n))+min(I(n, n)))/2, the midpoint between the maximum and the minimum brightness in the vicinity S=Med (I (n, n)), the median of the brightness in the vicinity S=⟨I(n, n)⟩ the mean of the brightness in the vicinity At block 208, local noise pixels are de-contrasted to a particular contrast level for each block that contains text. For example, the local filter module 114 may de-contrast identified noise pixels by calculating a new brightness $I_1$ for the pixel as the statistic S and half of the text contrast $C_t$ multiplied by the sign of the difference between the brightness I and the statistic S:

$$I_1 = S + \tfrac{1}{2}C_t \times \mathrm{sgn}(I-S)$$

The new brightness for the pixel I represents the restriction on the level of de-contrasting for the local noise pixels. In some implementations, the new brightness $I_1$ uses an estimate of an average of the text contrast $C_t$ of the block to perform de-contrasting of the local noise pixels without damaging the text structures in the block. In other words, if the contrast of a noise pixel is less than half of the text contrast $\tfrac{1}{2}C_t$, then de-contrasting is not performed for the noise pixel. If the contrast of a noise pixel is more than half of the text contrast $\tfrac{1}{2}C_t$, then the contrast of the noise pixel is reduced by half of the text contrast $\tfrac{1}{2}C_t$.

At block 209, background pixels, pixels of connected components, and problem pixels of connected components with uncertain binarization are selected in each block that contains text. The selection of the background pixels, the connected component pixels, and the problem pixels may be performed on the text blocks that have had the noise pixels reduced or de-contrasted at block 208. For example, the local filter module 114 may filter the grayscale image using a 3×3 median filter. Then, in a neighborhood m×m (e.g., 7×7) of each pixel, the local filter module 114 calculates a difference between a maximum brightness and minimum brightness within the neighborhood m×m. If the difference is less than b×$C_t$ (where the parameter b may be 0.5<b<1), then the local filter module 114 determines that the pixel is a background pixel. Otherwise, the local filter module 114 determines that the pixel is part of the connected component (e.g., a text character or part of a text character to be recognized by OCR, or other feature depicted in the electronic image 120, such as a line or shape).

Alternatively or in addition, the local filter module 114 may identify background pixels, connected component pixels, and problem pixels of connected components using binarization and morphological erosion (or dilatation in the case of inverse text). The local filter module 114 applies a 3×3 erosion (or dilatation) filter multiple times to the binarized image, such as two to four times (e.g., where the number of times may be configurable). After the multiple applications of the filter, the local filter module 114 determines that the remaining black pixels, for example, are pixels of connected components and the white pixels are background pixels. Alternatively, in the case of inverse text, white pixels are pixels of connected components and black pixels are background pixels.

The local filter module 114 identifies as problem pixels of connected components the pixels of the connected components where the brightness of the image lies in some interval around the binarization threshold th of the text block: th–delta<I<th+delta, where I is the pixel brightness and delta<$C_t$/2 (e.g., the pixels of connected components that have an uncertain binarization). The local filter module 114 may chose the delta interval based training images, described below.

At block 210, a noise variance of sigma$^2$ in the background pixels of each block that contains text is measured, where sigma is the standard deviation. For example, in the background pixels identified at block 209, the local filter module 114 may calculate the variance of the brightness I of the image using the standard formula:

$$sigma^2 = \frac{1}{N} \times \sum (I(i, j) - m)^2,$$

where m is the average brightness value of the background pixels in the block, N is the total number of the background pixels in the block, and the summation is performed over the background pixels (i,j) in the block.

At block 211, a local-adaptive filtering by selective averaging with preservation of contours is performed for each block that contains text. The local-adaptive filtering may be performed on the text blocks that have had the noise pixels reduced or de-contrasted. The local-adaptive filtering may include using different filter parameter values for background pixels, connected component pixels, and problem pixels of connected components in the image. The filter parameters in the problem pixels of the connected components are determined based on voting on the pixels of the connected components with a similar local neighborhood structure.

In a first example, the local filter module 114 may perform a fast version of the local-adaptive filtering using sigma-filtering on the pixels. As a result of the sigma-filtering, the local filter module 114 outputs for the central pixel of the neighborhood F×F with the brightness I the average brightness ⟨I⟩ over the pixels (i,j) of the neighborhood F×F that satisfy the following condition, where I(i,j) is the brightness of each pixel (i,j) in the neighborhood F×F around the central pixel:

$$I-k \times sigma < I(i,j) < I+k \times sigma$$

The local filter module 114 may select the parameters F and k when processing the training images, as described below. The local filter module 114 may use this filtering option in cases where the computing resources (e.g., processor speed, memory speed, available memory, or battery life) are limited, for example, when processing images on a mobile device.

In a second example, the local filter module 114 may perform a sophisticated version of the local-adaptive filtering on the pixels using different parameters for the three types of pixels (background, connected component, and problem of connected component). In some implementations, the image is processed by an instance of the local filter module 114 or another module on the server system 112. For this sophisticated version, the local filter module 114 may use a controlled sigma filter for the three types of pixels. The local filter module 114 uses an estimate of the undistorted image to determine the neighbors involved in local averaging rather than the actual pixel brightness value. As a result of the controlled sigma filter, the local filter module 114 outputs for the central pixel of the neighborhood F×F for the background pixels the average brightness ⟨I⟩ over the pixels (i, j) of the neighborhood F×F that satisfy the condition previously described for the fast version of the local-adaptive filtering. Alternatively or in addition, the local filter module 114 may use a different smoothing filter to identify the output brightness for central pixels that are of the background pixel type.

As a result of the controlled sigma filter, the local filter module 114 outputs for the central pixel of the neighborhood F×F for the pixels of the connected components the average brightness ⟨I⟩ over the pixels (i,j) of the neighborhood F×F that satisfy the following conditions:

$M_1 - k \times sigma < I(i,j) < M_1 + k \times sigma$, if the brightness of the central pixel is below the threshold th, and $M_2 - k \times sigma < I(i,j) < M_2 + k \times sigma$, if the brightness of the central pixel is not below (e.g., above or equal to) the threshold th.

As a result of the controlled sigma filter, the local filter module 114 outputs for the central pixel of the neighborhood F×F for the problem pixels of the connected components the average brightness ⟨I⟩ over the pixels (i,j) of the neighborhood F×F that satisfy the following conditions:

$M_1 - k \times sigma < I(i,j) < M_1 + k \times sigma$ (formula A), if in most pixels of the connected components of a block with a similar local neighborhood the brightness of those pixels is below the threshold th, and $M_2 - k \times sigma < I(i,j) < M_2 + k \times sigma$ (formula B), if in most pixels of the connected components of a block with a similar local neighborhood the brightness of those pixels is not below the (e.g., above or equal to) threshold th.

For each problem pixel of a connected component, the local filter module 114 may identify pixels having the similar local neighborhood (e.g., similar pixels) within the text block N×N among the pixels of the connected components. The local filter module 114 may use binary local descriptors, such as Binary Robust Invariant Scalable Keypoints (BRISK), to search for the similar local neighborhoods. The local filter module 114 may calculate descriptors for each of the pixels in the connected components. For example, the local filter module 114 may determine that a pixel of a connected component is similar to a problem pixel, and may be used for choosing between formulas A and B above. If the Hamming distance between the local descriptors for the problem pixel and the pixel of the connected component is less than a threshold D, then the pixel of the connected component is similar to the problem pixel and therefore the similar pixels of the connected component can be used for choosing between formulas A and B above.

The local filter module 114 may first perform an approximate search for similar local neighborhoods on a reduced image, such as at half the resolution of the binarized image. The local filter module 114 may decrease the resolution of the image using bilinear interpolation. In some implementations, bilinear interpolation may cause the noise to become more similar to Gaussian noise and less correlated over the image space (e.g., with the image signal), which may result in the search for the similar local neighborhoods of the pixels being more accurate.

The local filter module 114 may then, in the original image, make a refinement in a neighborhood of the similar pixel found at the reduced resolution. Alternatively or in addition, the local filter module 114 may consider each of the pixels of this neighborhood as being similar and each may participate in voting for the choice of the conditions in formulas A and B. The local filter module 114 may perform the search for the pixels of the connected components with similar neighborhoods and for voting for the formulas A and B on a pre-processed image. Pre-processing may include, for example, binarization or the use of a smoothing filter with contour preservation.

Alternatively or in addition, the local filter module 114 may use the result of a non-local means based on the identified similar pixels when filtering the problem pixels rather than the formulas A and B. The local filter module 114 may determine that a problem pixel of the connected component has too few participants gathered to vote (e.g., less than some threshold V) or the voting is such that the majority exceeds the minority insignificantly (e.g., by an amount less than $V_1$ percent of the number of participants in the vote), then instead of the formulas A and B, the local filter module 114 may use a 3×3 smoothing filter with contour preservation for the problem pixels of the connected components, such as a symmetric nearest neighbor (SNN) filter or a Kuwahara-Nagao filter.

In another example, the local filter module 114 may use an original 3×3 smoothing filter with preserving contours. The local filter module 114 may perform the averaging in the 3×3 window along one of four directions, such as horizontal, vertical, or one of two diagonal triples of the neighborhood of the problem pixel, including the central pixel. The local filter module 114 may select the direction for smoothing based on the analysis of the histogram of the gradient directions with four quantization levels in the 3×3 window. The local filter module 114 may use the bin from the histogram with the maximum histogram value for estimating the direction of the gradient in the central element if the value of the histogram for the bin exceeds a threshold of five ninths or six ninths of the nine pixels in the 3×3 window, for example. The local filter module 114 may perform smoothing on a triple of pixels perpendicular to the estimated gradient direction. If the local filter module 114 determines that the maximum value of the histogram does not exceed the threshold, then the local filter module 114 may provide the original value of the central pixel as the result of the filtering. In some implementations, the local filter module 114 may calculate the gradient using the Sobel operator. In addition, the local filter module 114 may apply this filter to the same problem pixels multiple times.

At block 212, the local contrast of low-contrast pixels is set to a particular value for each block that contains text. For example, if the local filter module 114 identifies low contrast pixels in the connected components as satisfying the conditions $abs(I-S) < c \times \frac{1}{2} C_t$, where $c < 1$, then the local filter module 114 increases the contrast of the identified low contrast pixels in the connected components to the specified value. The local filter module 114 calculates the new value of the brightness for the pixel as:

$$I_1 = S + c \times \frac{1}{2} C_t \times sgn(I-S)$$

The local filter module 114 may merge results of the local-adaptive filtering in the areas where the blocks overlap. If the local filter module 114 divided the image into overlapping blocks, then the local filter module 114 may merge the results to provide an inconspicuous transition between the blocks in the areas where the blocks overlap. The local filter module 114 may merge the results of the local-adaptive filtering of adjacent overlapping blocks 1 and 2 by multiplying the brightness values $I_1$ and $I_2$ from corresponding pixels in blocks 1 and 2 by the corresponding weights and adding the corresponding values together, so that the value of the filtered image in the overlap zone is:

$$I(1,2) = p \times I_1 + (1-p) \times I_2 \quad \text{(formula C)}$$

Figure 3:
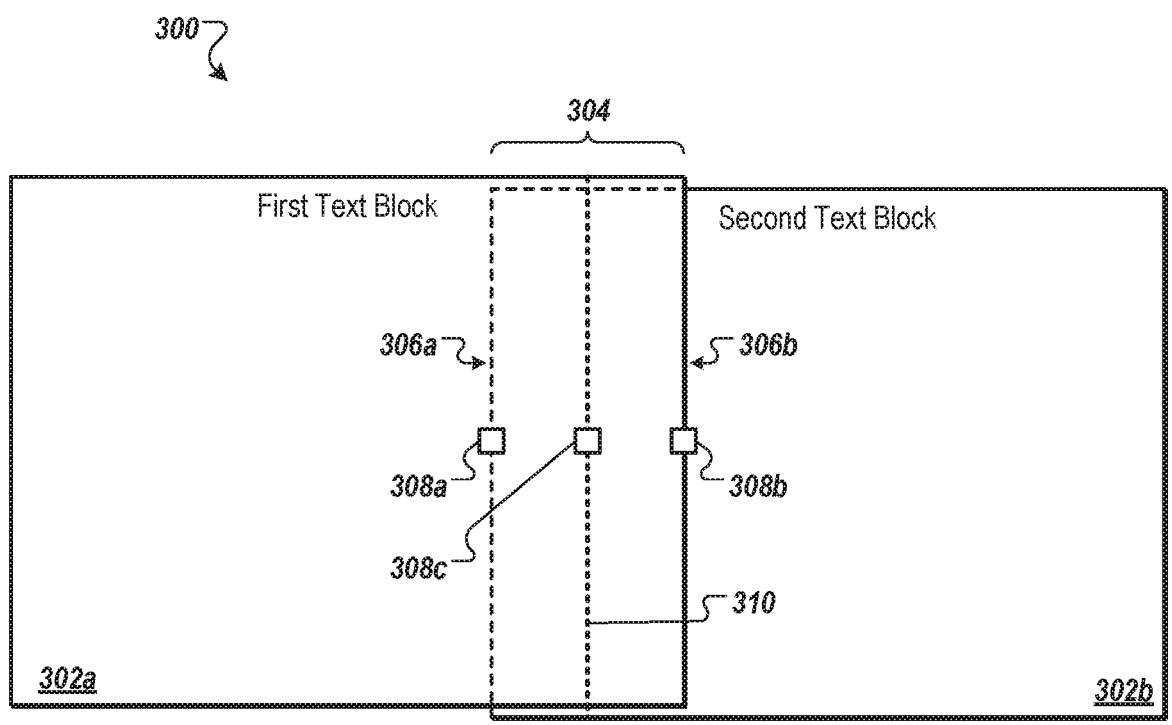
FIG. 3 is a schematic diagram that shows an example of merging brightness values of pixels from overlapping portions of text blocks.

FIG. 3 is a schematic diagram 300 that shows an example of merging brightness values of pixels from an overlapping portion 304 of multiple text blocks 302a-b. The overlapping portion 304 represents an area where the brightness calculations previously described were separately performed for the first text block 302a and the second text block 302b. This may result in a calculation of multiple different brightness values for a same location or pixel within the electronic image 120, such as for multiple pixels 308a-c. At a first edge 306a of the overlapping portion 304, the local filter module 114 may use a value of one for p, which results in formula C reducing to the brightness $I_1$ of the pixel from block 1 and the brightness $I_2$ of the pixel from block 2 is not used. At a second edge 306b of the overlapping portion 304, the local filter module 114 may use a value of zero for p, which results in formula C reducing to the brightness $I_2$ of the pixel from block 2 and the brightness $I_1$ of the pixel from block 1 is not used. The local filter module 114 may vary the value of p linearly from one to zero across the overlapping portion 304 from the first edge 306a to the second edge 306b. Accordingly, the local filter module 114 may use a value of one half for p along a center line 310 in the overlapping portion 304, which results in one half of the brightness $I_1$ of the pixel from block 1 and one half of the brightness $I_2$ of the pixel from block 2 being used in the calculation for the merged brightness value of the pixel 308c in the electronic image 120.

The server system 112 and/or the user electronic device 102 may include a training module 122. The training module 122 may select parameters for the process 200 by adjusting the parameters so that when used on a training data set of highly noisy images of physical documents, the adjusted parameters achieve a high or highest possible OCR accuracy on the training data set given the noise in the images. In some implementations, the training module 122 may be included in or have access to the local filter module 114 to perform the training of the parameters. The training module 122 may use a database of noisy images that depict text where the local signal-to-noise ratio in text blocks within the noisy images is less than four. The formula $R = \langle C_i^1 \rangle / \langle C_i^2 \rangle$ may be used to estimate the signal-to-noise ratio. Alternatively, the formula $R = C_i / \text{sigma}$ may be used to estimate the signal-to-noise ratio. In some implementations, the training module 122 may use images with R<4 as the training images for selecting the parameters.

The training module 122 is provided with the actual text in the noisy images. For example, the actual text may be stored in the database. The training module 122 may compare text resulting from OCR performed on the enhanced training images to the actual text to determine an accuracy of the OCR, such as a percentage number of errors in the recognized text (e.g., a total number of error characters in the recognized text divided by a total number of characters to be recognized). The local filter module 114 may perform the enhancement of the training images and the OCR module 113, 118 may perform the OCR of the enhanced training images using multiple different values for the parameters. The training module 122 may choose the optimal values for the parameters including N, n, m, b, c, the statistics type S, k, F, D, delta and other filter parameters that result in the best OCR accuracy between the text resulting from the OCR of the enhanced training images and the actual text in the training images.

The training module 122 may use an initial approximate range of possible values for each of the parameters. The initial approximate range may be specified manually by a user of the training module 122. The ranges may be chosen in accordance with a priori known statistics of various text and noise characteristics. The ranges may be, for example:

N: 5% to 15% or 2 to 6 rows
k: 1 to 5
F: 11 to 35 pixels
D: 50 to 150
c: 0.5 to 0.95
0.5<b<1
delta=q*$C_i$/2, where q: 0.05 to 0.5
n: 3,5,7
m: 5,7,9,11,13,15
S: one of the three formulas described above In some implementations, the training module 122 determines the value for each of the parameters above in the order listed by varying the values for each of the parameters within the allowed range. The training module 122 may fix a determined optimal value for a parameter and then proceed to optimizing a next parameter in the list. The training module 122 may initially use a value in the middle of the allowed range for each parameter before varying the values for the parameter.

For example, the training module 122 may begin with determining the optimal value $N_{opt}$ for N. The training module 122 determines percentages of errors for OCR performed on the enhanced training images for values of N in the specified range (e.g., in a particular increment, such as 1%, one row, or one half of a row). The training module 122 may set the values of the other parameters at the middle of the ranges for the other parameters. The training module 122 compares the resulting error percentages for each of the values of N to determine which value of N provides the smallest percentage of errors. The training module 122 then fixes the value of N at the determined value $N_{opt}$ and proceeds to varying a next parameter, such as k, while leaving the values for the other unprocessed parameters at the middle values. The training module 122 determines percentages of errors for OCR performed on the enhanced training images for values of k in the specified range (e.g., in a particular increment, such as 0.2) and compares the error percentages to determine which value of k provides the least errors.

The process may continue until the training module 122 has determined values for each of the parameters. In some implementations, if the optimal value of a parameter is at the boundary of the range for the parameter, then the training module 122 may expand the range at the boundary until the expanded range includes a value for the parameter that no longer provides the smallest percentage of errors.

In some implementations, for pixels of connected components with uncertain binarization, the local filter module 114 may determine the brightness of the pixels with uncertain binarization by voting on the pixels of the connected components of the block that have a similar structure of the local neighborhood. The local filter module 114 may perform this determination to correct the result of binarization for pixels of the connected components that have uncertain binarization, and to obtain an improved binarized image. The local filter module 114 may determine the brightness of the problem pixel in the connected component on the binarized image by voting on the pixels of the connected component in the block that have a similar structure of the local neighborhood. The local filter module 114 may perform processing similar to block 211 where voting for the calculation of the value of (I) for problem pixels in a connected component was performed on the grayscale image, except that the local filter module 114 performs this processing on the binarized image rather than the grayscale image. The method described above allows obtaining an enhanced image (e.g., enhanced contrast and/or reduced noise), which may result in better accuracy when OCR is performed on the enhanced image. The generation of the enhanced image may use less system resources (e.g., less memory usage, storage space, and/or processing unit cycles) than conventional image enhancement techniques and may provide more accurate results, for example, even on mobile devices.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 4:
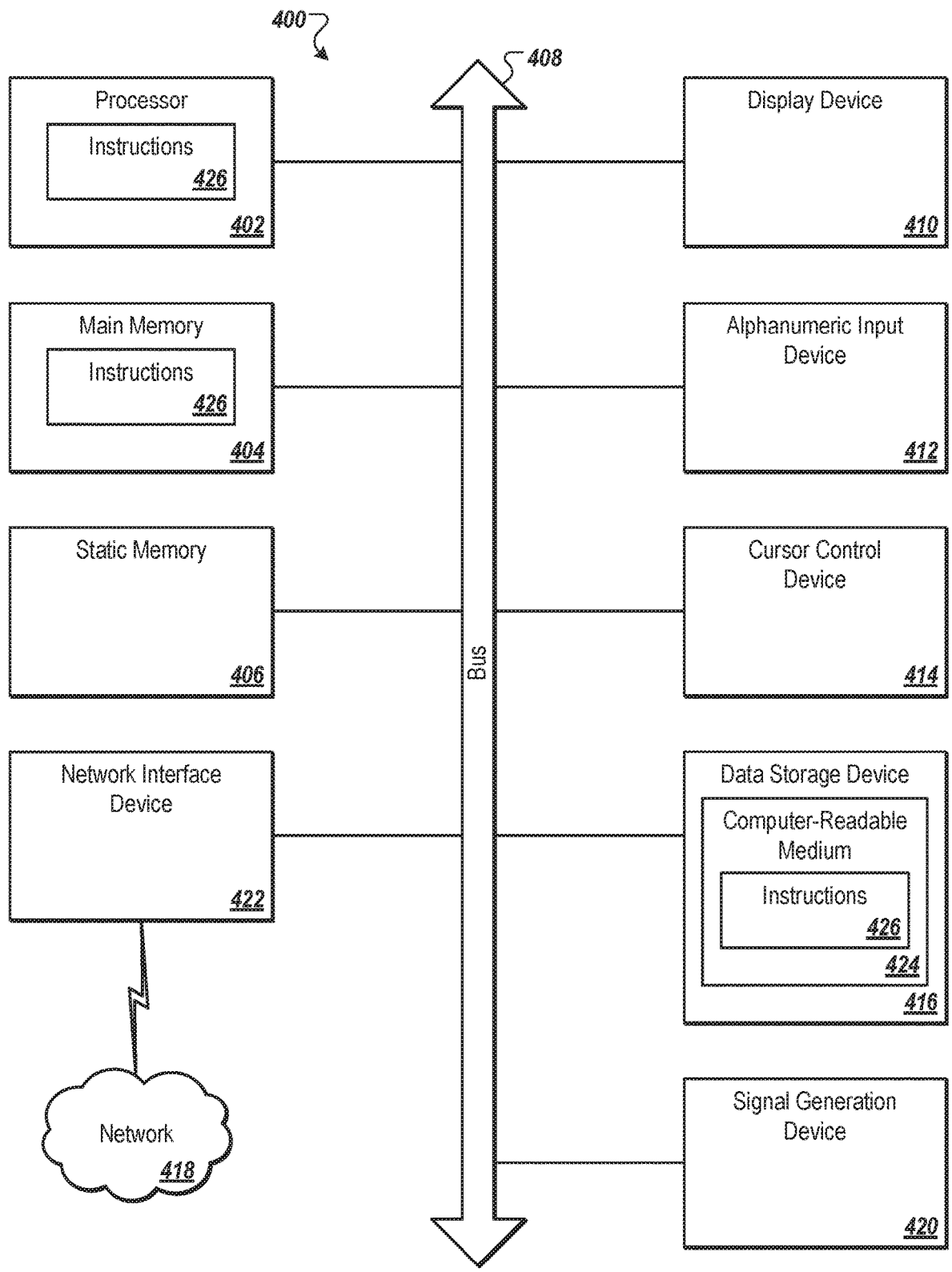
FIG. 4 is a schematic diagram that shows an example of a computing system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the local filter module 114, the training module 122, the OCR module 113, 118, the user electronic device 102, and/or the server system 112 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the local filter module 114, the training module 122, the OCR module 113, 118, the user electronic device 102, and/or the server system 112 embodying any one or more of the methodologies or functions described herein. The sets of instructions 426 of the local filter module 114, the training module 122, the OCR module 113, 118, the user electronic device 102, and/or the server system 112 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying one or more blocks in an electronic image that depicts text characters;
   identifying one or more text blocks among the blocks that depict the text characters;
   identifying an average text contrast for each of the text blocks;
   identifying a type for each pixel in each of the text blocks based on the average text contrast, wherein the identified type is selected from a background pixel type, a connected component pixel type, and a problem pixel type, and wherein the background pixel type indicates that the pixel is a part of a background of the electronic image, the connected component pixel type indicates that the pixel is part of a connected component depicted within the electronic image, and the problem pixel type indicates that the pixel is part of a connected component depicted within the electronic image and has an uncertain binarization;
   performing, by at least one processing device, local adaptive filtering on a first neighborhood of pixels around each pixel in each of the text blocks to determine a brightness for the pixel based on the identified type; and
   storing, in at least one memory, the electronic image comprising the determined brightness for each pixel in each of the text blocks.

2. The method of claim 1, further comprising acquiring, from an image-capturing interface of a user electronic device, the electronic image, wherein the user electronic device comprises the processing device.

3. The method of claim 1, further comprising causing optical character recognition of the text characters from the electronic image based on the determined brightness for each pixel in each of the text blocks.

4. The method of claim 1, further comprising:
   identifying at least one first pixel in at least one text block among the text blocks as noise based on a difference in a brightness of the first pixel and a brightness statistic of a second neighborhood of pixels around the first pixel in the text block compared to the average text contrast; and
   reducing a contrast of the noise pixel based on the brightness, the brightness statistic, and the average text contrast, wherein the reduction is limited by the average text contrast, and wherein the identification of the type is performed after the reduction of the contrast of the noise pixel.

5. The method of claim 4, wherein the brightness statistic comprises at least one of a midpoint of a brightness of pixels in the second neighborhood, a median of the brightness of the pixels in the second neighborhood, or a mean of the brightness of the pixels in the second neighborhood.

6. The method of claim 1, further comprising:
   determining that the brightness of at least one first pixel having the connected component pixel type in at least one block among the text blocks has a contrast that is below a threshold based on the average text contrast and a brightness statistic of a second neighborhood of pixels around the first pixel; and
   setting the brightness of the first pixel based on the average text contrast and the brightness statistic to increase the contrast of the first pixel.

7. The method of claim 1, wherein the local adaptive filtering uses a different calculation for each of the background pixel type, the connected component pixel type, and the problem pixel type.

8. The method of claim 1, wherein the text blocks overlap with one another, and wherein the method further comprises merging the determined brightness for overlapping portions of adjacent ones of the text blocks based on corresponding weights of overlapping ones of pixels in the overlapping portions.

9. A non-transitory computer-readable medium having instructions stored thereon that, when executed by at least one processing device, cause the processing device to:
identify one or more blocks in an electronic image that depicts text characters;
identify one or more text blocks among the blocks that depict the text characters;
identify an average text contrast for each of the text blocks;
identify a type for each pixel in each of the text blocks based on the average text contrast, wherein the identified type is selected from a background pixel type, a connected component pixel type, and a problem pixel type, and wherein the background pixel type indicates that the pixel is a part of a background of the electronic image, the connected component pixel type indicates that the pixel is part of a connected component depicted within the electronic image, and the problem pixel type indicates that the pixel is part of a connected component depicted within the electronic image and has an uncertain binarization;
perform, by the processing device, local adaptive filtering on a first neighborhood of pixels around each pixel in each of the text blocks to determine a brightness for the pixel based on the identified type; and
store, in at least one memory, the electronic image comprising the determined brightness for each pixel in each of the text blocks.

10. The computer-readable medium of claim 9, wherein the instructions are further to cause the processing device to acquire, from an image-capturing interface of a user electronic device, the electronic image, wherein the user electronic device comprises the processing device.

11. The computer-readable medium of claim 9, wherein the instructions are further to cause the processing device to cause optical character recognition of the text characters from the electronic image based on the determined brightness for each pixel in each of the text blocks.

12. The computer-readable medium of claim 9, wherein the instructions are further to cause the processing device to:
identify at least one first pixel in at least one text block among the text blocks as noise based on a difference in a brightness of the first pixel and a brightness statistic of a second neighborhood of pixels around the first pixel in the text block compared to the average text contrast; and
reduce a contrast of the noise pixel based on the brightness, the brightness statistic, and the average text contrast, wherein the reduction is limited by the average text contrast, and wherein the identification of the type is performed after the reduction of the contrast of the noise pixel.

13. The computer-readable medium of claim 12, wherein the brightness statistic comprises at least one of a midpoint of a brightness of pixels in the second neighborhood, a median of the brightness of the pixels in the second neighborhood, or a mean of the brightness of the pixels in the second neighborhood.

14. The computer-readable medium of claim 9, wherein the local adaptive filtering uses a different calculation for each of the background pixel type, the connected component pixel type, and the problem pixel type.

15. The computer-readable medium of claim 9, wherein the text blocks overlap with one another, and wherein the instructions are further to cause the processing device to merge the determined brightness for overlapping portions of adjacent ones of the text blocks based on corresponding weights of overlapping ones of pixels in the overlapping portions.

16. A system comprising:
at least one memory that stores instructions; and
at least one processing device configured to execute the instructions to:
identify one or more blocks in an electronic image that depicts text characters;
identify one or more text blocks among the blocks that depict the text characters;
identify an average text contrast for each of the text blocks;
identify a type for each pixel in each of the text blocks based on the average text contrast, wherein the identified type is selected from a background pixel type, a connected component pixel type, and a problem pixel type, and wherein the background pixel type indicates that the pixel is a part of a background of the electronic image, the connected component pixel type indicates that the pixel is part of a connected component depicted within the electronic image, and the problem pixel type indicates that the pixel is part of a connected component depicted within the electronic image and has an uncertain binarization;
perform, by the processing device, local adaptive filtering on a first neighborhood of pixels around each pixel in each of the text blocks to determine a brightness for the pixel based on the identified type; and
store, in at least one memory, the electronic image comprising the determined brightness for each pixel in each of the text blocks.

17. The system of claim 16, wherein the processing device is further to execute the instructions to cause to cause optical character recognition of the text characters from the electronic image based on the determined brightness for each pixel in each of the text blocks.

18. The system of claim 16, wherein the processing device is further to execute the instructions to:
identify at least one first pixel in at least one text block among the text blocks as noise based on a difference in a brightness of the first pixel and a brightness statistic of a second neighborhood of pixels around the first pixel in the text block compared to the average text contrast; and
reduce a contrast of the noise pixel based on the brightness, the brightness statistic, and the average text contrast, wherein the reduction is limited by the average text contrast, and wherein the identification of the type is performed after the reduction of the contrast of the noise pixel.

19. The system of claim 18, wherein the brightness statistic comprises at least one of a midpoint of a brightness of pixels in the second neighborhood, a median of the brightness of the pixels in the second neighborhood, or a mean of the brightness of the pixels in the second neighborhood.

20. The system of claim 16, wherein the local adaptive filtering uses a different calculation for each of the background pixel type, the connected component pixel type, and the problem pixel type.

* * * * *